United States Patent
De Kouchkovsky et al.

(10) Patent No.: US 6,222,918 B1
(45) Date of Patent: Apr. 24, 2001

(54) CALL DISTRIBUTION FACILITY

(75) Inventors: Nicolas De Kouchkovsky, Nanterre; Denis Derville, Paris; Jean-Yves Bizien; Sauveur Baruch, both of Brest, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/077,664

(22) PCT Filed: Oct. 7, 1997

(86) PCT No.: PCT/FR97/01789

§ 371 Date: Jun. 3, 1998

§ 102(e) Date: Jun. 3, 1998

(87) PCT Pub. No.: WO98/16053

PCT Pub. Date: Apr. 16, 1998

(30) Foreign Application Priority Data

Oct. 7, 1996 (FR) .................................................. 96 12184

(51) Int. Cl.[7] .................................................. H04M 7/00
(52) U.S. Cl. .......................... 379/265; 379/266; 379/309
(58) Field of Search .................................. 379/215, 265, 379/266, 309, 34, 113, 233

(56) References Cited

U.S. PATENT DOCUMENTS

| | | |
|---|---|---|
| 5,206,903 | 4/1993 | Kohler et al. . |
| 5,299,259 * | 3/1994 | Otto ........................................ 379/266 |
| 5,506,898 * | 4/1996 | Costantini et al. ..................... 379/266 |
| 5,721,770 * | 2/1998 | Kohler ..................................... 379/266 |
| 5,754,639 * | 5/1998 | Flockhart et al. ...................... 379/265 |
| 5,764,741 * | 6/1998 | Barak ....................................... 379/113 |
| 5,825,869 * | 10/1998 | Brooks et al. ......................... 379/265 |
| 5,870,464 * | 2/1999 | Brewster et al. ...................... 379/219 |

FOREIGN PATENT DOCUMENTS

| | | |
|---|---|---|
| 0342667A2 | 11/1989 | (EP) . |
| 2265066A | 9/1993 | (GB) . |

OTHER PUBLICATIONS

W. Huybrechts, "Operational Aspects of the System 12 Operator Subsystem", Proceedings of the International Switching Symposium—Part 1—Session 22, Paper 4, May 7–11, 1984, p. 107.

J. P. Berger et al, "Sysope: Systeme Numerique Autonome D'Operatrices" Commutation et Transmission, vol. 10, No. 3, 1988, pp. 5–18.

* cited by examiner

Primary Examiner—Ahmad Matar
Assistant Examiner—William J. Deane, Jr.
(74) Attorney, Agent, or Firm—Sughrue, Mion, Zinn, Macpeak & Seas, PLLC

(57) ABSTRACT

The facility gives users of a telecommunications network access to services provided by agents. Call-directors receive the calls, groups of agents process them, and transit units serve as interfaces between the call-directors and the agents. First means select a transit unit for a call that has reached a call-director, as a function of a minimum cost obtained by comparing costs which are established for the various transit units. Second means select a processing group for a call that has reached a transit unit that was previously empty of calls, with selection being as a function of a minimum cost obtained by comparing costs established for the various processing roups. Third means select a transit unit for processing a call waiting in a transit unit as soon as an agent becomes available, as a function of a maximum cost obtained by comparing costs established for the various transit units.

5 Claims, 2 Drawing Sheets

CALL DISTRIBUTION FACILITY

The present invention relates to a facility for distributing telephone calls in a network that generally includes one or more interconnected telephone exchanges to which telephone terminals or stations are connected, with at least some of them being designed to satisfy requests for service and/or information coming from callers in the form of telephone calls, said calls being set up via junctors through which the terminals or the sets of the callers, i.e. of the users ringing in, enter into communication with the facility.

BACKGROUND OF THE INVENTION

Originally, call distribution facilities were generally implemented in the form of specialized equipment designed to be associated with telephone exchanges in order to enable callers to be put into communication telephonically with agents for answering their requests. Subsequently, it has become commonplace to integrate such facilities which often include a large software content, in telephone exchanges, and in particular in private type exchanges made available to users, e.g. businesses where the users are often employees or clients.

Such facilities enable numerous businesses to provide information and service on request in very refined individualized and possibly personalized manners; as a result, they contribute to the image given to the outside world of a business running such a facility.

Naturally, the primary function of a call distribution facility is to route the calls of telephone callers to agents, in human or machine form, for the purpose of taking them into account and/or answering them, at least in part.

Various criteria can be involved in the operations designed to cause a call to be distributed to an agent by such a facility, and it is common practice to take account of the caller concerned, the purpose of the call, and/or the time that the caller has already waited on a particular call. These criteria are used by the distribution facility and/or by the personnel running and/or supervising the facility so that the most appropriate possible response is given to each call as a function of the needs of callers, and in particular the needs of callers having a call in progress at that time and the available resources for processing by human or by machine.

Naturally speed of response is an essential element that such a facility must take into account insofar as such speed of response is one of the elements having the most direct effect on caller appreciation of the service provided by the facility and the departments it serves, with this element being largely responsible for the impression of satisfaction or dissatisfaction felt by users.

This leads to distribution facilities being organized in such a manner as to have different queues enabling callers to be distributed as a function of agent availability, with callers being given priorities as a function of how long their respective calls have been waiting and/or criteria related to the callers themselves, providing there is some way in which callers can be identified selectively when they call. Nevertheless, such facilities necessarily have limits and they do not always perform satisfactorily, particularly during periods of high calling traffic, and as a result waiting times can lengthen for certain unlucky callers. As in any traffic that is insufficiently supervised, localized overloads can arise which then penalize some of the callers waiting for a reply because they are in a queue that is temporarily blocked, whereas other queues can exist simultaneously that are lightly loaded and that could serve those callers.

This has also led to facilities in which the various processes that may be performed on the occasion of a call are split up into sequences of operations that are organized in modular manner and that make it possible to perform redistribution at various stages in the processing.

Nevertheless, the various facilities mentioned above are not really satisfactory insofar as they do not provide sufficient information, particularly in the event of potential or actual overloading, thus preventing the operator from having an overall view sufficiently in advance, which leads to callers being dissatisfied when they are poorly served and sometimes left hanging on without any relevant information, in the event of call processing being abnormally delayed. Unfortunately, as already mentioned, the conditions under which such facilities run contribute very greatly to the image of the business running the facilities and of the services they are providing in the eyes of the people using those services.

OBJECTS AND SUMMARY OF THE INVENTION

The invention thus provides a telephone call distribution facility for giving the users of sets and/or terminals in a telecommunications network access to at least one service provided by means of at least one agent, said facility including at least one call-director receiving telephone calls for accessing a service, at least one group of processing agents, and at least one transit unit for calls received via a call-director and waiting for processing by an agent.

According to a characteristic of the invention, the facility comprises:

"primary distribution" first means for selecting a transit unit for a call reaching a call-director, the selection being made as a function of a minimum cost obtained by comparing costs established on the basis of indications characteristic of the present situations of each of the transit units and of each of the processing groups capable at that time of being put into communication with said call-director;

"downstream secondary distribution" second means for selecting a processing group for a call that has reached a transit unit that was previously empty of calls; the selection being as a function of a minimum cost obtained by comparing costs established on the basis of indications characteristic of the present situations of each of the processing groups capable at that time of being put into communication with said transit unit;

"upstream secondary distribution" third means for selecting a transit unit for processing a call waiting in said unit as soon as an agent becomes available to perform processing, selection being as a function of a maximum cost obtained by comparing costs established on the basis of indications characteristic of the situations present in each of the transit units capable at that time of being put into communication with the processing group of which the available agent forms a part; and "tertiary distribution" fourth means for selecting an available agent in a processing group to take account of a call coming from a transit unit, on the basis of indications characteristic of the situation present in the processing group with which said transit unit has been put into communication.

According to another characteristic of the invention, the facility includes first means for selecting a transit unit for a call that has reached a call-director as a function of a minimum cost obtained after comparing costs that are established for each of the transit units that could be put into communication with the receiving call-director on the basis of defined characteristic indications which include an index for the occupancy of the transit unit in waiting calls, a standardized waiting time period estimated for each call in said unit, and a priority level given to said unit.

According to another characteristic of the invention, the facility includes second means for selecting a processing group for a call that has reached a transit unit that was previously empty of calls, as a function of a minimum cost obtained by comparing costs established for each of the processing groups capable at that time of being put into communication with the transit unit, on the basis of characteristic indications including an index relating to the availability of agents in the processing group, a priority level given to said transit unit, a value for the longest rest time relating to the agents of the processing group, and a cost constant associated with the transit unit.

According to another characteristic of the invention, the facility includes third means for selecting a transit unit for processing a call waiting in said unit as soon as an agent becomes available to process a call, selection being as a function of a maximum cost obtained by comparing costs established for each of the transit units capable at that time of being put into communication with the processing group of which the available agent forms a part, on the basis of characteristic indications which include an index for the occupancy of the transit unit, a priority level allocated to said transit unit, a real waiting duration value for the first call to be served in said unit, and a cost constant associated with said unit.

According to another characteristic of the invention, the facility includes weighting means that are adjustable and that are associated with the situation characteristic indications to enable costs to be graded for different processing groups and/or transit units.

BRIEF DESCRIPTION OF THE DRAWING

The invention, its characteristics, and its advantages are described in greater detail below with reference to the figures listed.

DETAILED DESCRIPTION

Figure 1:
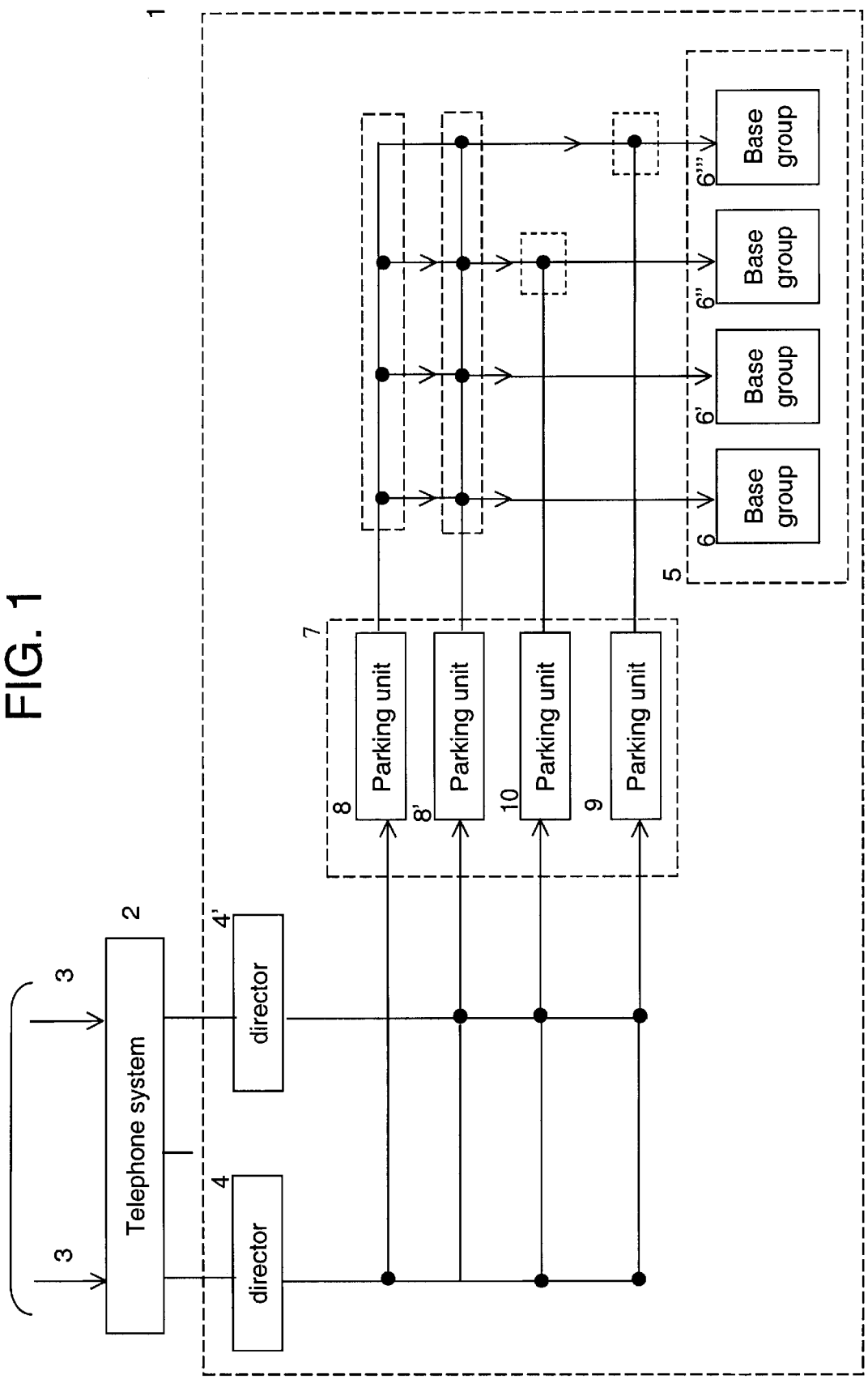
FIG. 1 is a simplified diagram of a call distribution facility of the invention.

The call distribution facility 1 shown diagrammatically in FIG. 1 is assumed to receive telephone calls set up by, or possibly to, remote parties via telephone and/or radiotelephone terminals or sets in a telecommunications network 2. By way of example, the network may be organized about a telephone exchange or a plurality of interconnected telephone exchanges. By way of example, the network 2 may include a plurality of junctors 3 via which calls are conveyed, e.g. by implementing a known process such as the processes known as direct dialing in or direct inward access.

The calls under consideration here are calls seeking to access a determined service that the caller has selected. As is known, various types of service selection by caller can be implemented. In practice, the selection performed can take place in an exchange of the telecommunications network 2 by the incoming call being given direct inward access, with a particular junctor or a junctor belonging to a set of incoming junctors being allocated to a determined service. The selection can also be of the direct dialing in type, with various numbers that can be dialed then being individually allocated to the various different services that can be requested. Selection may optionally be performed as a function of characteristics specific to the caller, if the caller is previously listed and if a call from such a caller takes place in such a manner as to enable the caller to be identified, e.g. if information characteristic of the caller is forwarded while the call is being set up, e.g. the caller's individual subscriber number. Such selection can also be performed by an automatic switch, e.g. a switch associated with a voice server, in response to a request made by a caller to the initially-dialed server, with such a request being implemented in voice form in the server described herein by way of example.

Whatever the form of selection adopted, calls reaching the call distribution facility 1 are directed to incoming call-directors such as 4 and 4' each allocated to a particular service and each serving calls destined for that service. The services under consideration herein can be constituted, for example, by a booking service in a transportation business or a vehicle hire business, a telephone service giving clients direct access to various operations in a telephone-sales business, in a banking network, or in any other undertaking equipped for this purpose.

Calls heading to a particular service and directed to the incoming call-director of the service via the telecommunications network 2 using a selection process as mentioned above reach the incoming call-director in chronological order of arrival so as to be taken into account as quickly as possible and so that the most appropriate response can be given to each of them.

Insofar as caller requests can be very varied, there must exist various possible kinds of response which are designed in this case to be provided by means of a call processing assembly 5 suitable for including at least one call processing group 6, and generally a plurality of groups 6, that supply answers to questions asked by callers as a function of availability at the time the call is made.

In the example described, the first processing group 6 is assumed to be a base group comprising at least one and more generally a plurality of human agents, each having at least one telephone terminal or set. The incoming calls successively received by the group are shared between the agents as a function of the availability of each of them, thereby enabling the agents to speak to the callers and find out the purpose of each call. Thereafter, the agent can either provide the response if that is possible for the agent, or else engage a process for enabling a response to be provided in the most appropriate manner possible.

In large capacity distribution facilities, provision is made to associate the base group(s) 6 with one or even more similar "overflow" groups 6'.

An overflow group such as 6' may possibly be constituted in the same manner as the base group, and its human agents may be in a position to reply to calls that can be processed by the human agents of the base group 6 when they can no longer reply themselves to new incoming calls given that they are already busy replying to incoming calls that arrived earlier.

The processing assembly 5 of a call distribution facility 1 may also include the following, for example:

a voice messaging group (not shown in FIG. 1) comprising at least one machine type agent-suitable for recording questions made by voice over a telephone line by a caller;

a voice answering group such as 6", likewise comprising at least one machine type agent suitable for providing answers that are either standardized, or possibly personalized, and that are organized in a manner that is designed in advance for answering questions put by callers and that are formulated in a determined manner; and a re-routing group such as 6''' having at least one human and/or machine agent for redirecting calls that need to be taken into account by a group other than the group reached by the call in question, or which should have been reached by the call in question under conditions other than those which obtained prior to the call being re-routed.

Calls reaching the call distribution facility 1 via the call-directors pass through an intermediate assembly 7 making it possible, where necessary, to park such calls before they are taken into account for processing by one or other of the groups in the processing assembly 5.

The intermediate assembly 7 has at least one transit unit of the call-queuing type, referred to herein as a parking unit, such as the units 8 and 8', that make it possible to store calls temporarily and when necessary while waiting to be processed, until the calls are processed respectively by the agents in the processing assembly 5.

The order in which calls parked in a parking unit are forward to the processing assembly 5 may be of the first-in-first-out type so that order of arrival is maintained. Other processing orders can be implemented to favor certain callers or certain operations over others, implementing implementation rules or with the agreement of the operator running the call distribution facility.

The intermediate assembly 7 may also include at least one other call queuing type transit unit referred to herein as an "inter-aid" unit, such as the unit 9 which makes it possible to retain a call temporarily and where necessary when the calls needs to be re-routed for some reason, e.g. a call whose processing is forwarded by an agent in one of the groups of the processing assembly to another group for specific processing, e.g. in addition to the processing that can be performed by the agent who forwarded the call.

The intermediate assembly optionally also includes an intermediate transit unit of the pseudo-queue type, such as the unit 10, for calls that are not in fact going to wait, because of the particular processing that is to be applied to them. Such a pseudo-queue is used, for example, for calls that are to be re-routed, in the example shown the unit 10 is assumed to be used for calls for which it is desired to discourage continuance. These calls are usually switched to an answering machine in group 6" which issues a dissuasive message in voice form to callers, for example a message asking them not to call again before a given length of time has elapsed, because the processing assembly 5 is overloaded.

The call distribution facility shown diagrammatically in FIG. 1 is assumed to be "frozen" in a particular configuration that can be modified under the control of the operator running the facility, as a function of changes in caller needs and in the means available. In the configuration shown, each call-director such as 4 or 4' corresponding to one particular service is capable of accessing a plurality of call distribution directions, each of which corresponds to a reception group. Each reception group associates one or more groups of the processing assembly 5 with a transit unit of the queue or pseudo-queue type, in the intermediate assembly 7, and it has one or more determined processing functions.

In the example shown, a first reception group comprises the parking unit 8 and the groups 6, 6', and 6" of the processing assembly 5, and it processes calls coming from the call-director 6 which normally correspond to requests relating to a given service, e.g. a service having a particular individual telephone number. A second reception group comprises parking unit 8' and the set of groups 6 to 6''' in the processing assembly 5, and it processes calls coming from the call-director 6' which corresponds to calls relating to a different determined service. Two other reception groups comprise respectively, in one case the inter-aid unit 9 with the re-routing group 6''', and in the other case the dissuasion unit 10 with the answering machine group 6", both of which reception groups are organized to receive calls from one or other of the call-directors 4 and 4' when those calls are to be re-routed or to receive a dissuasion message, e.g. prior to being rejected or to waiting for a long time.

Re-routing may be local, and it can be implemented, for example, within a telephone exchange then constituting the main part of the telecommunications network 2, or it may involve remote telephone exchanges to which calls may be sent via the junctors 3 of the telecommunications network 2.

As mentioned above, the call distribution facility 1 of the invention is designed to enable both the elements that make it up and the way in which calls are distributed to be modified and reconfigured, and for this to be done even while the facility is in operation.

Figure 2:
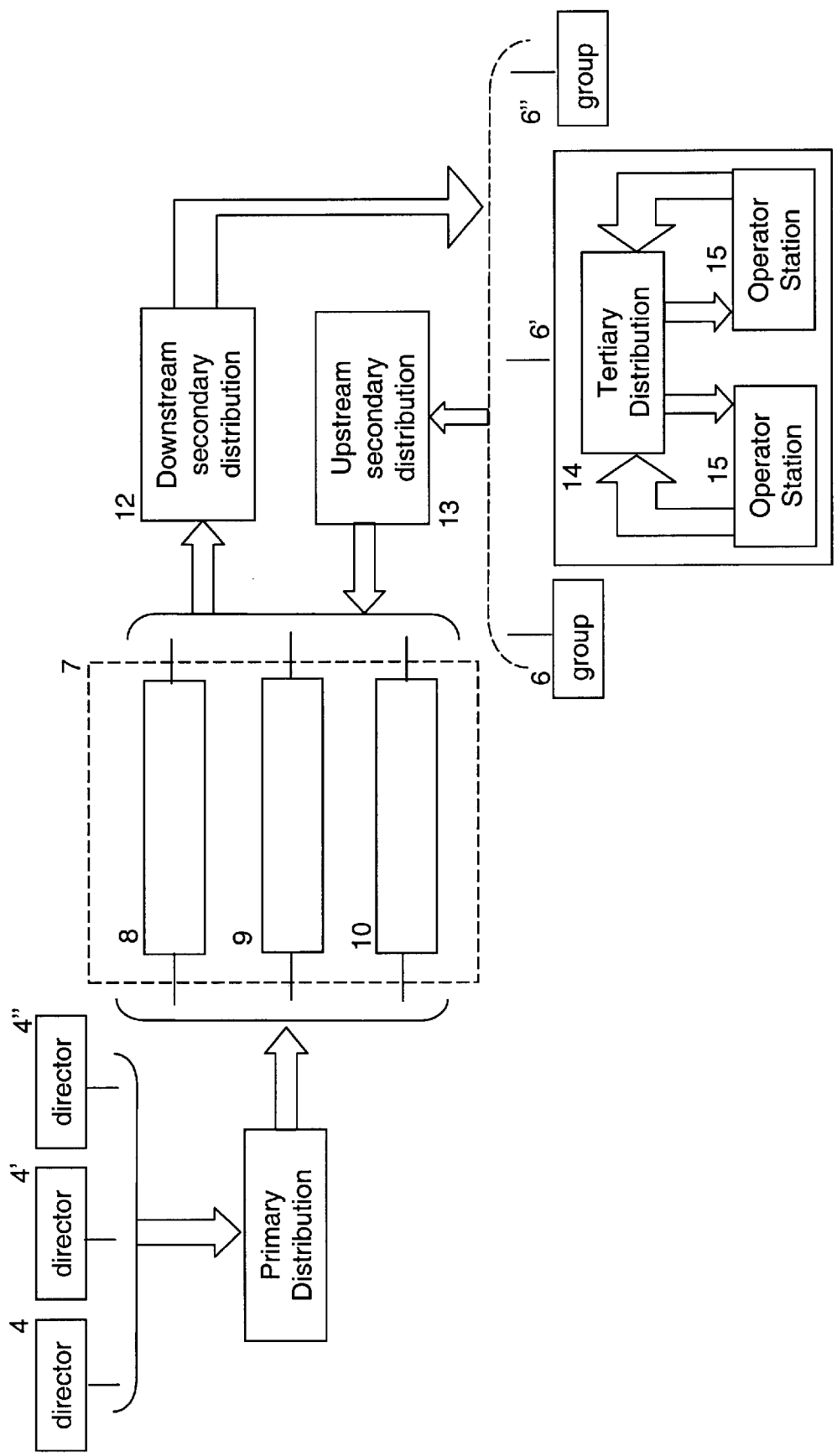
FIG. 2 is a block diagram relating to the distribution structure implemented.

To this end, these calls are distributed in three levels as shown symbolically in FIG. 2.

Depending on level, account is taken of notions concerning degree of occupation of the resources available to the call distribution facility 1, expected waiting time for a call, length of agent rest time, priority, and more particularly cost and real waiting time per call.

In particular, provision is made for a call that cannot find an available agent in a processing group to which it ought to be sent, to be applied to a parking unit or routed to an overflow group, possibly after a determined length of time has elapsed, or to be re-routed through the telecommunications network 2 to a remote processing group, e.g. associated with a telephone exchange other than the exchange at which it initially arrived. Such operations naturally imply that the state of the group to which a call is sent needs to be taken into consideration before initiating any routing or rerouting. Insofar as such operations of routing and rerouting tend to slow down the supply of an answer to the request that is going to be made for a call processed in this way, provision is made to give priority to calls that have been routed or re-routed in this way, at least within the processing group that performs the corresponding operation.

Provision is also made for a call that has been put into a parking unit, such as 8, to be processed by the processing groups associated with said unit in one of the reception groups (such as the groups 6, 6', or 61" for the parking unit 8). A call injected into a parking unit can thus optionally be routed to overflow from the base group associated with that unit (such as the group 6 for the parking unit 8) to another processing group in the same reception group, as a function of the respective states of the processing groups that are capable of handling the call. Thus, provision is made to take into account the longest rest times for processing groups that are made up of human agents, as well as fixed priorities, where the fixed priorities are handled by at least one supervisor from amongst the staff involved. A plurality of waiting levels can be handled for a call waiting in a parking unit, these levels being designed to be handled as a function of the call-directors via which the parked calls have arrived, and provision is made to take account of the real waiting time of each of them. Thus, if a human agent becomes available in a processing group, the particular call that agent will then process amongst the calls parked in a transit unit will depend, in particular, on the real waiting times of the various calls.

Any telephone call received via an incoming call-director such as 4 is subjected to a first distribution stage to send it to a transit unit of the intermediate assembly 7, and as a general rule towards a transit unit such as one of the parking units 8 and 8'. This first stage is provided by "primary" distribution symbolized under reference 11 in FIG. 2.

The primary distribution 11 is thus implemented for each call arriving via one of the call-directors of the call distribution facility 1, and it serves to select a reception group and consequently a transit unit such as one of the units 8, 9, or 10, to which each call is sent, this defining primary direction for each received call.

An algorithm is implemented for this purpose, and the selection it performs for a call takes into account the known states of the possible primary directions and of the transit units that are available at the time when the algorithm is implemented.

This is performed by taking into account the authorized or non-authorized state of each possible direction as represented by a configuration parameter, the blocked or non-blocked state of each possible direction as represented by a blocking parameter which can be adjusted by the supervisor, as mentioned above, and the priority given to each direction as represented by a priority parameter likewise adjustable by the supervisor.

Also taken into account are the respective occupancy levels of the transit units to which the call in question may be directed and the estimated waiting times for each of said units. on the basis of those elements, the algorithm determines a cost function F(Di), as defined below:

$$F(Di) = IRFA + k1*Pi + k2APN + Ci$$

where:

- $k1$ and $k2$ are coefficients associated with the call-director from which the call in question comes;
- IRFA is an integer, e.g. in the range 0 to 10, defining the occupancy level of the transit unit in question;
- Pi is an integer, e.g. lying in the range 0 to 10, giving the priority level given to the direction under consideration, said priority being considered herein as being higher for smaller numerical values;
- APN is a fractional value lying in the range 0 to 1 and corresponding to a standardized expected waiting time for a call routed in the direction under consideration, said value APN representing a fraction of a determined maximum waiting time AM which can be adjusted by the supervisor; and
- Ci is a cost constant associated with the direction under consideration for the call-director taken by the call.

The choice of direction to be taken and thus of the transit unit of the intermediate assembly selected for a given call is determined by selecting the direction which has the smallest cost function of the various directions possible.

By way of example, for a call-director capable of having access to three directions, D1, D2, and D3, and consequently to three out of "n" possible units, which units, may for example, be two parking units 8 and one dissuasion unit 10, if the priorities respectively allocated to said units are represented by the digits 1, 2, and 3, it is possible to define a distribution model having costs as defined in the table below:

| Direction | Priority | Cost |
|---|---|---|
| D1 | 1 | 0 |
| D2 | 2 | 0 |
| D3 | 3 | 5 |
| other directions | n | 100 |

In this case, it is assumed that very large weight is given to the cost constants for directions that are not intended for the call-director under consideration under the conditions that presently obtain.

It is possible for a supervisor to give priority between two directions so as to distinguish one from the other when the occupancy states of the parking units are identical.

This is achieved, for example, by giving priority to the unit which it is more advantageous to use, and this can be done by giving the value 0.1 to the coefficient k1 and the value 0 to the coefficient k2 for the two directions D1 and D2 under consideration, thus giving the following results depending on the occupancy states of the two parking units 8 and 8' under consideration:

|  | 8 empty | empty < 8 < full | 8 full |
|---|---|---|---|
| 8' empty | D1 | D2 | D2 |
| empty < 8' < full | D1 | D1 | D2 |
| 8' full | D1 | D1 | D3 |

It is thus possible for the supervisor to give priority to a direction in which the call waiting time as estimated as a function of the number of waiting calls in the parking unit associated with said direction is more limited than for another direction.

By way of example, this is implemented by giving the value 0.01 to the factor k1 and the value 1 to the factor k2, which gives the following results where priority is given as a function of the occupancy states of the two parking units 8 and 8' under consideration:

|  | 8 empty | empty < 8 < full | 8 full |
|---|---|---|---|
| 8' empty | D1 or D2 | D2 | D2 |
| empty < 8' < full | D1 | D1 or D2 | D2 |
| 8' full | D1 | D1 | D3 |

The supervisor preferably has a plurality of primary distribution models, e.g. as generated by simulation and validated by implementation, and can adjust them or possibly substitute one for another as a function of running conditions, should that be deemed necessary.

A second distribution stage is designed to send each of the calls that has reached one or other of the transit units of the intermediate assembly 7, and in particular one of the parking units, to the processing group capable of replying to the request of the caller making the call. This second stage is provided by "secondary" distribution which implements two distinct distribution processes, a "downstream" process and an "upstream" process, the corresponding distributions being symbolized by references 12 and 13 in FIG. 2.

The downstream secondary distribution referenced 12 is designed for use when a call reaches a transit unit, e.g. a parking unit 8, in which there is then no other waiting call, thus making it necessary to transfer the incoming call immediately to one of the processing groups, e.g. group 6, forming a part of the reception group that includes the transit unit in question and that is capable of taking the call.

The upstream secondary distribution referenced 13 is designed to be used to assign a call to a processing group when an agent, whether a human or a machine, becomes available in a specific group of the processing assembly 5 in order to determine whether or not there is at least one waiting call in the transit unit which is included in a reception group that also forms a part of the determined group in which the agent that has become available is to be found.

The two kinds of secondary distribution 12 and 13 are preferably based on the same mechanism for optimization independently of the call-director, of the reception group, and of the processing group in question.

As mentioned above, the downstream secondary distribution 12 is implemented each time a call is transmitted by a call-director to a transit unit, and in particular a parking unit 8, an inter-aid unit 9, or a dissuasion unit 10, when said unit is otherwise empty of any waiting call. It is designed to determine the secondary direction corresponding to the processing group to which the call under consideration is to be routed.

The distribution algorithm implemented determines a cost function F(Di) for each downstream secondary direction which is analogous to that provided for primary distribution and which is defined by the formula:

$$F(Di) = IDR + k'1 * Pi + k'2 PLTR + Ci$$

where:
- IDR corresponds to a resource availability index for the processing group accessible via the direction under consideration, in this case the availability of agents in said group, be they humans and/or machines, as the case may be;
- $k'1$ and $k'2$ are coefficients characterizing the algorithm and associated with the transit unit under consideration, with $k'2$ having a negative value in this case;
- Pi is the priority value of the direction under consideration which is given to the processing group under consideration and which can be adjusted by the supervisor;
- PLTR is the value of the longest rest time observed at that time for agents in the treatment group under consideration; and
- Ci is a cost constant associated with the direction under consideration, and which is likewise adjustable by the supervisor.

The downstream secondary direction selected for taking a call by means of this algorithm is the direction having the lowest cost as in the selection made at primary distribution level 11.

Upstream secondary distribution 13 is implemented each time an agent becomes available in a determined group of the processing assembly 7 and is thus in a position to process a call which is itself taken into account by a reception group of which the processing group to which the agent under consideration forms a part.

This upstream secondary distribution is designed to select the reception group, i.e., in fact, the transit unit which now has priority for causing one of its calls to be processed by the processing group in which an agent has become available. The upstream secondary distribution thus determines the upstream secondary direction corresponding to a particular transit unit which is selected by determining a greatest cost.

The distribution algorithm implemented determines a cost function F(Di) per upstream secondary direction that is defined by the formula:

$$F(Di) = IRFA + k''1 * Pi + k''2 AR + Ci$$

where:
- IRFA is an occupancy index for the transit unit under consideration;
- Pi is the priority given to the upstream secondary direction under consideration;
- $k''1$ and $k''2$ are coefficients characterizing the algorithm and associated with the processing group under consideration;
- $k''1$ is a negative value to take account of the fact that the lowest priorities correspond to the highest Pi values;
- AR is a real waiting time determined for the first call to be served in the transit unit under consideration; and
- Ci is the cost constant mentioned above.

The upstream secondary direction selected by this algorithm is the highest cost direction so as to process as quickly as possible calls coming from priority transit units whenever agents become available in the processing assembly 5.

The downstream and upstream secondary distributions serve in particular to define and manage a real waiting time threshold per direction prior to selection. This amounts to imposing a minimum waiting time for a call that has reached a transit unit prior to eventual processing by a given processing group. This makes it possible in particular to adjust the time periods for triggering overflow and re-routing. This also makes it possible to take account in weighted manner the states of the groups in the processing assembly 5 and the priorities of said groups relative to each reception group, the longest agent rest time, the previously tested state of an overflow group prior to directing a call to said group, the management of a minimum waiting threshold per processing group for a call parked in a transit unit, and priority processing of a re-routed call.

A third distribution stage directs each call transmitted to a group of the processing assembly 5 to a particular agent of said group when such agents are available and calls arrive for processing by the group to which they belong.

This third stage is provided by "tertiary" distribution referenced 14 in FIG. 2, which implements a specific distribution process to enable each call taken into account by a processing group such as the group 6' to reach that one of the agents which is going to treat the call, at least in part.

Each agent, whether a human or a machine, has telephone equipment 15 available, such as a terminal or set if the agent is human, or at least a circuit if the agent is a machine, enabling the agent to process telephonically the call which is transmitted thereto so as to answer it in a determined manner, as is known elsewhere.

The tertiary distribution 14 is assumed in this case to be split into elements associated with each of the groups of the processing assembly 5 and it is capable of operating in different known modes depending on the needs of each group, which modes are preferably configurable by the supervisor. For example, distribution may be performed by searching on the basis of a header, or in cyclical manner, or by taking into account the longest rest time existing in the processing group for an agent in the group. It causes the call to be presented to the agent, preferably together with information relating to the call that has been selected by at least some of the elements of the call distribution facility 1 and/or the telecommunications network 2.

What is claimed is:

1. A telephone call distribution facility for giving the users of sets and/or terminals in a telecommunications network access to at least one service provided by means of at least one agent, said facility including at least one call-director receiving telephone calls for accessing a service, at least one group of processing agents, and at least one transit unit for calls received via a call-director and waiting for processing by an agent, the facility comprising:

- "primary distribution" first means for selecting a transit unit for a call reaching a call-director, the selection being made as a function of a minimum cost obtained by comparing costs established on the basis of indications characteristic of the present situations of each of the transit units capable at that time of being put into communication with said call-director;
- "downstream secondary distribution" second means for selecting a processing group for a call that has reached a transit unit that was previously empty of calls; the selection being as a function of a minimum cost obtained by comparing costs established on the basis of indications characteristic of the present situations of each of the processing groups capable at that time of being put into communication with said transit unit;
- "upstream secondary distribution" third means for selecting a transit unit for processing a call waiting in said unit as soon as an agent becomes available for processing, selection being as a function of a maximum cost obtained by comparing costs established on the basis of indications characteristic of the situations present in each of the transit units capable at that time of being put into communication with the processing group of which the available agent forms a part; and
- "tertiary distribution" fourth means for selecting an available agent in a processing group to take account of a call coming from a transit unit, on the basis of indications characteristic of the situation present in the processing group with which said transit unit has been put into communication.

2. A facility according to claim 1, including first means for selecting a transit unit for a call that has reached a call-director, as a function of a minimum cost obtained after comparing costs that are established for each of the transit units that could be put into communication with the receiving call-director on the basis of defined characteristic indications which include an index for the occupancy of the transit unit in waiting calls, a standardized waiting time period estimated for each call in said unit, and a priority level given to said unit.

3. A facility according to claim 1, including second means for selecting a processing group for a call that has reached a transit unit that was previously empty of calls, as a function of a minimum cost obtained by comparing costs established for each of the processing groups capable at that time of being put into communication with the transit unit, on the basis of characteristic indications including an index relating to the availability of agents in the processing group, a priority level given to said transit unit, a value for the longest rest time relating to the agents of the processing group, and a cost constant associated with the transit unit.

4. A facility according to claim 1, including third means for selecting a transit unit for processing a call waiting in said unit as soon as an agent becomes available to process a call, selection being as a function of a maximum cost obtained by comparing costs established for each of the transit units capable at that time of being put into communication with the processing group of which the available agent forms a part, on the basis of characteristic indications which include an index for the occupancy of the transit unit, a priority level allocated to said transit unit, a real waiting duration value for the first call to be served in said unit, and a cost constant associated with said unit.

5. A facility, according to claim 1, including weighting means that are adjustable and that are associated with the situation characteristic indications, and particularly with the distribution directions to enable costs to be graded for different processing groups and/or transit units.

* * * * *